(12) United States Patent
Mellinger

(10) Patent No.: US 8,973,928 B2
(45) Date of Patent: Mar. 10, 2015

(54) BABY CARRIAGE AND ACCOMMODATING MECHANISM THEREOF

(75) Inventor: Dylan Anthony Mellinger, Narvon, PA (US)

(73) Assignee: Wonderland Nurserygoods Company Limited, Kwai Chung, N.T. (HK)

(*) Notice: Subject to any disclaimer, the term of this patent is extended or adjusted under 35 U.S.C. 154(b) by 10 days.

(21) Appl. No.: 13/532,799

(22) Filed: Jun. 26, 2012

(65) Prior Publication Data
US 2013/0001927 A1 Jan. 3, 2013

Related U.S. Application Data

(60) Provisional application No. 61/571,638, filed on Jul. 1, 2011.

(51) Int. Cl.
B62B 9/26 (2006.01)
(52) U.S. Cl.
CPC .............. B62B 9/26 (2013.01); B62B 2202/56 (2013.01)
USPC ................... 280/47.35; 280/33.992; 379/454; 224/409
(58) Field of Classification Search
CPC ................................ B62B 9/26; B62B 3/1428
USPC ............... 280/33.992; 379/454; 224/409, 411
See application file for complete search history.

(56) References Cited

U.S. PATENT DOCUMENTS

| 3,251,543 | A | * | 5/1966 | Bush et al. | 235/1 R |
|---|---|---|---|---|---|
| 4,583,753 | A | * | 4/1986 | Economy | 280/33.992 |
| 4,901,901 | A | * | 2/1990 | Reitenour | 224/277 |
| 4,998,277 | A | * | 3/1991 | Rioux, Jr. | 379/454 |
| 5,004,252 | A | * | 4/1991 | Kraper | 280/33.992 |
| 5,033,709 | A | * | 7/1991 | Yuen | 248/313 |
| 5,176,392 | A | * | 1/1993 | Graebe, Jr. | 280/33.992 |
| 5,179,590 | A | | 1/1993 | Wang | |
| 5,187,744 | A | * | 2/1993 | Richter | 379/449 |
| 5,222,132 | A | * | 6/1993 | Rioux, Jr. | 379/455 |
| 5,344,225 | A | * | 9/1994 | Blyth | 312/34.4 |
| 5,457,745 | A | * | 10/1995 | Wang | 379/454 |
| 5,555,302 | A | * | 9/1996 | Wang | 379/446 |
| 5,566,609 | A | * | 10/1996 | Kirschner | 108/42 |
| 5,568,549 | A | * | 10/1996 | Wang | 379/446 |
| 5,615,258 | A | * | 3/1997 | Ho | 379/446 |
| 5,664,714 | A | * | 9/1997 | Navarro et al. | 224/275 |
| 5,836,051 | A | * | 11/1998 | Myers | 16/436 |
| 5,836,563 | A | * | 11/1998 | Hsin-Yung | 248/316.4 |
| 5,839,919 | A | * | 11/1998 | Chen | 439/529 |
| 5,996,866 | A | * | 12/1999 | Susko et al. | 224/281 |
| 6,073,901 | A | * | 6/2000 | Richter | 248/316.4 |

(Continued)

FOREIGN PATENT DOCUMENTS

| DE | 20 2005 015 737 U1 | 1/2006 |
|---|---|---|
| DE | 20 2010 010 893 U1 | 11/2010 |

(Continued)

Primary Examiner — Jeffrey J Restifo
(74) Attorney, Agent, or Firm — Winston Hsu; Scott Margo

(57) ABSTRACT

A baby carriage includes a frame and an accommodating mechanism. The accommodating mechanism is disposed on the frame and used for accommodating a mobile device. The accommodating mechanism includes a base and a clamping member. The clamping member is movably disposed on the base and used for clamping the mobile device on the base. This invention also discloses an accommodating mechanism having two crossing recesses for accommodating the mobile device in different orientations.

24 Claims, 12 Drawing Sheets

(56) References Cited

U.S. PATENT DOCUMENTS

| | | | |
|---|---|---|---|
| 6,229,893 B1* | 5/2001 | Chen | 379/454 |
| 6,320,962 B1* | 11/2001 | Eisenbraun | 379/446 |
| 6,368,006 B1* | 4/2002 | Yang et al. | 403/84 |
| 6,453,588 B1* | 9/2002 | Lykens | 40/308 |
| 6,644,524 B1* | 11/2003 | Garvin | 224/411 |
| 6,666,473 B2* | 12/2003 | Hartenstine et al. | 280/647 |
| 7,195,155 B2* | 3/2007 | Garberg et al. | 235/383 |
| 7,621,431 B2* | 11/2009 | Williams | 224/409 |
| 7,686,322 B2* | 3/2010 | Longenecker et al. | 280/642 |
| 8,136,275 B2* | 3/2012 | Sonnendorfer et al. | 40/308 |
| 8,474,832 B2* | 7/2013 | Mersky | 280/33.992 |
| 8,631,983 B2* | 1/2014 | King | 224/555 |
| 2005/0242549 A1* | 11/2005 | Longenecker et al. | 280/642 |
| 2006/0131840 A1* | 6/2006 | Donay | 280/642 |
| 2006/0226191 A1* | 10/2006 | Williams | 224/409 |
| 2008/0296449 A1 | 12/2008 | Carnevali | |
| 2009/0212083 A1 | 8/2009 | Schneidau | |
| 2010/0264182 A1 | 10/2010 | Perlman | |
| 2011/0075331 A1* | 3/2011 | Greig et al. | 361/679.01 |
| 2012/0097721 A1* | 4/2012 | Winterhalter et al. | 224/409 |
| 2012/0161406 A1 | 6/2012 | Mersky | |
| 2013/0001927 A1* | 1/2013 | Mellinger | 280/647 |

FOREIGN PATENT DOCUMENTS

| | | |
|---|---|---|
| DE | 20 2011 051 891 U1 | 1/2012 |
| EP | 1 894 788 A1 | 3/2008 |
| FR | 2 920 118 A1 | 2/2009 |
| JP | H10315874 A | 12/1998 |
| KR | 1020110139979 A | 12/2011 |
| WO | 2011079344 A1 | 7/2011 |
| WO | 2011092348 A1 | 8/2011 |

* cited by examiner

BABY CARRIAGE AND ACCOMMODATING MECHANISM THEREOF

CROSS REFERENCE TO RELATED APPLICATIONS

This application claims the benefit of U.S. Provisional Application No. 61/571,638, which was filed on Jul. 1, 2011, and is incorporated herein by reference.

BACKGROUND OF THE INVENTION

1. Field of the Invention

The invention relates to a baby carriage and an accommodating mechanism thereof and, more particularly, to a baby carriage equipped with an accommodating mechanism capable of accommodating all mobile devices in at least both portrait and landscape orientations.

2. Description of the Prior Art

The use of mobile devices, such as smart phone, personal digital assistant (PDA), navigation devices, and so on, is becoming more and more prevalent amongst today's consumers. The incorporation of mobile devices into all daily tasks is also a rising trend. Today's consumer brings their device everywhere, which has developed a segment in the market for storing such devices on the go, such as phone cover, phone bag, and so on. However, a mechanism for accommodating the mobile devices on a baby carriage is still rare currently.

Furthermore, the problems with some accommodating mechanisms are that they are many times limited by which devices they can support, as well as the orientation in which the devices can be mounted. Offering a universal accommodating mechanism for a baby carriage that can support all devices reliably as well as offer at least both portrait and landscape orientations, would provide users with a solution that would meet their needs.

SUMMARY OF THE INVENTION

An objective of the invention is to provide a baby carriage equipped with an accommodating mechanism capable of accommodating all mobile devices.

Another objective of the invention is to provide a baby carriage equipped with an accommodating mechanism capable of accommodating all mobile devices in at least both portrait and landscape orientations.

According to one embodiment of the invention, a baby carriage comprises a frame and an accommodating mechanism. The accommodating mechanism is disposed on the frame and used for accommodating a mobile device. The accommodating mechanism comprises a base and a clamping member. The clamping member is movably disposed on the base and used for clamping the mobile device on the base.

In this embodiment, the base may has a first recess for accommodating the mobile device in a first orientation (e.g. landscape orientation) and a second recess for accommodating the mobile device in a second orientation (e.g. portrait orientation) different from the first orientation.

In this embodiment, the accommodating mechanism may further comprise a universal joint and the base is disposed on the frame through the universal joint such that the mobile device, which is clamped on the base, is capable of being changed in any orientations including portrait and landscape orientations.

According to another embodiment of the invention, an accommodating mechanism is used for accommodating a mobile device and comprises a base and a clamping member. The clamping member is movably disposed on the base and used for clamping the mobile device on the base.

In this embodiment, the base may has a first recess for accommodating the mobile device in a first orientation (e.g. landscape orientation) and a second recess for accommodating the mobile device in a second orientation (e.g. portrait orientation) different from the first orientation.

In this embodiment, the accommodating mechanism may further comprise a universal joint and the base is disposed on the frame through the universal joint such that the mobile device, which is clamped on the base, is capable of being changed in any orientations including portrait and landscape orientations.

According to another embodiment of the invention, a baby carriage comprises a frame and an accommodating mechanism. The accommodating mechanism is disposed on the frame and comprises a base. The base has a first recess for accommodating a mobile device in a first orientation (e.g. landscape orientation) and a second recess for accommodating the mobile device in a second orientation (e.g. portrait orientation) different from the first orientation.

In this embodiment, the accommodating mechanism may further comprise a clamping member movably disposed on the base and used for clamping the mobile device on the base.

According to another embodiment of the invention, an accommodating mechanism comprises a base and the base has a first recess for accommodating a mobile device in a first orientation (e.g. landscape orientation) and a second recess for accommodating the mobile device in a second orientation (e.g. portrait orientation) different from the first orientation.

In this embodiment, the accommodating mechanism may further comprise a clamping member movably disposed on the base and used for clamping the mobile device on the base.

As mentioned in the above, the invention uses the clamping member to clamp the mobile device on the base. Since the clamping member is movably disposed on the base, the clamping member can be operated to move according to sizes of different mobile devices so as to clamp all kinds of mobile devices on the base. Furthermore, the invention may form two recesses on the base for accommodating the mobile device in two different orientations (e.g. portrait and landscape orientations) or, alternatively, the invention may connect the base to the universal joint so as to adjust the mobile device in any orientations including portrait and landscape orientations. Accordingly, the accommodating mechanism of the invention can support all mobile devices as well as offer at least both portrait and landscape orientations such that it is very convenient for users to access or watch their device for purposes of using it while other tasks are being completed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
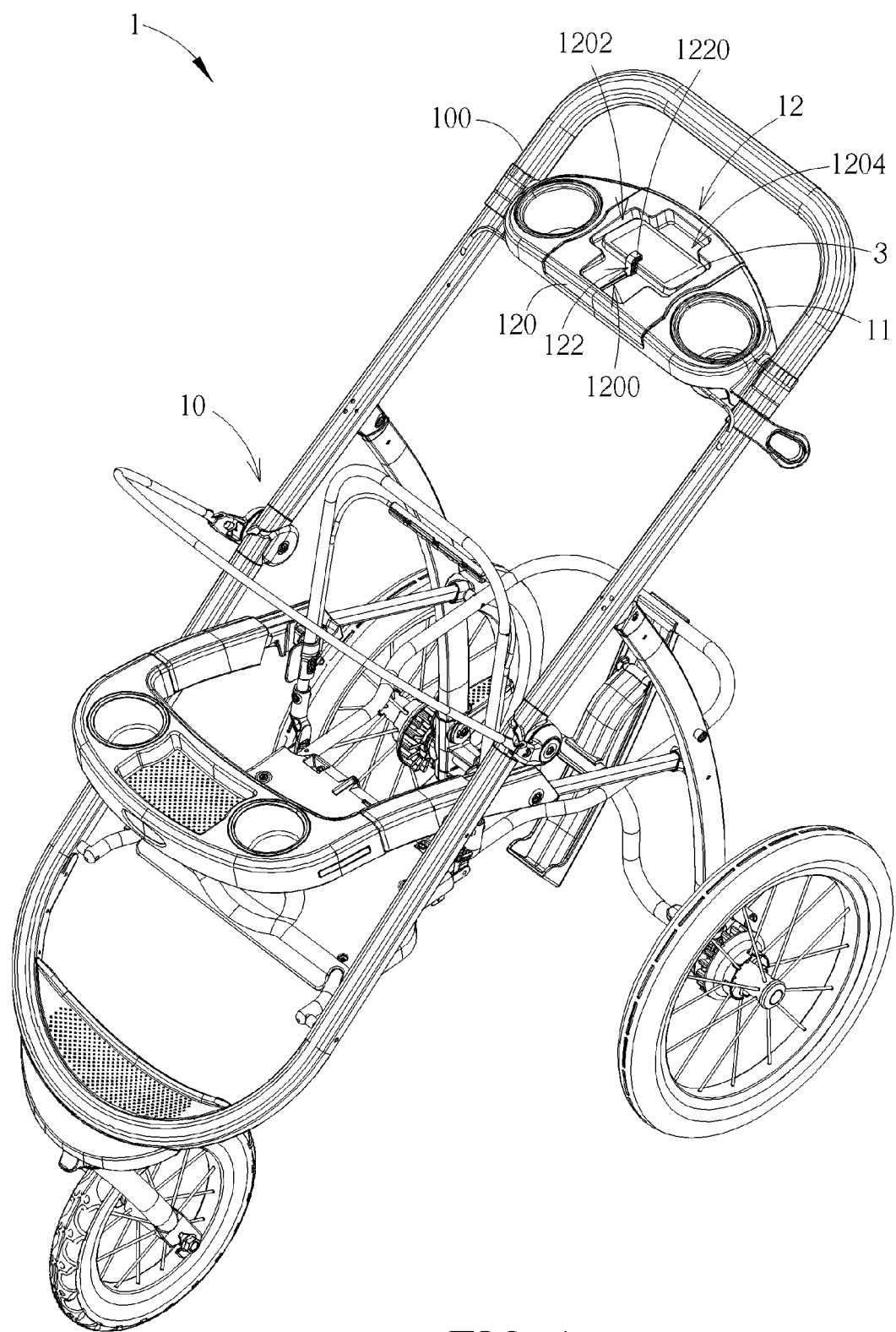
FIG. 1 is a perspective view illustrating a baby carriage according to an embodiment of the invention, wherein a mobile device is accommodated in the first recess of the base in a first orientation.
Figure 2:
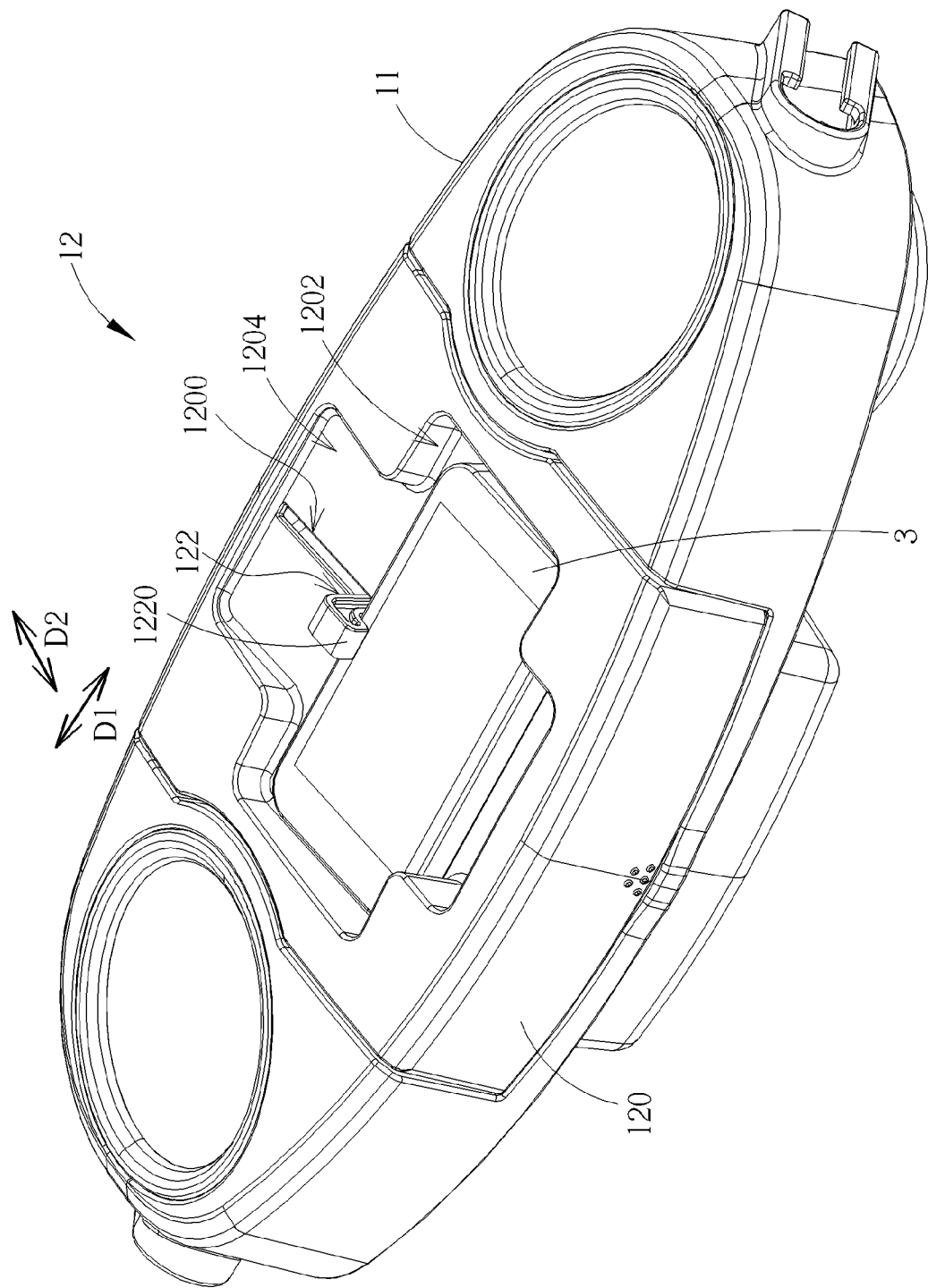
FIG. 2 is a perspective view illustrating the organizer and the accommodating mechanism shown in FIG. 1 configured in another view angle.
Figure 3:
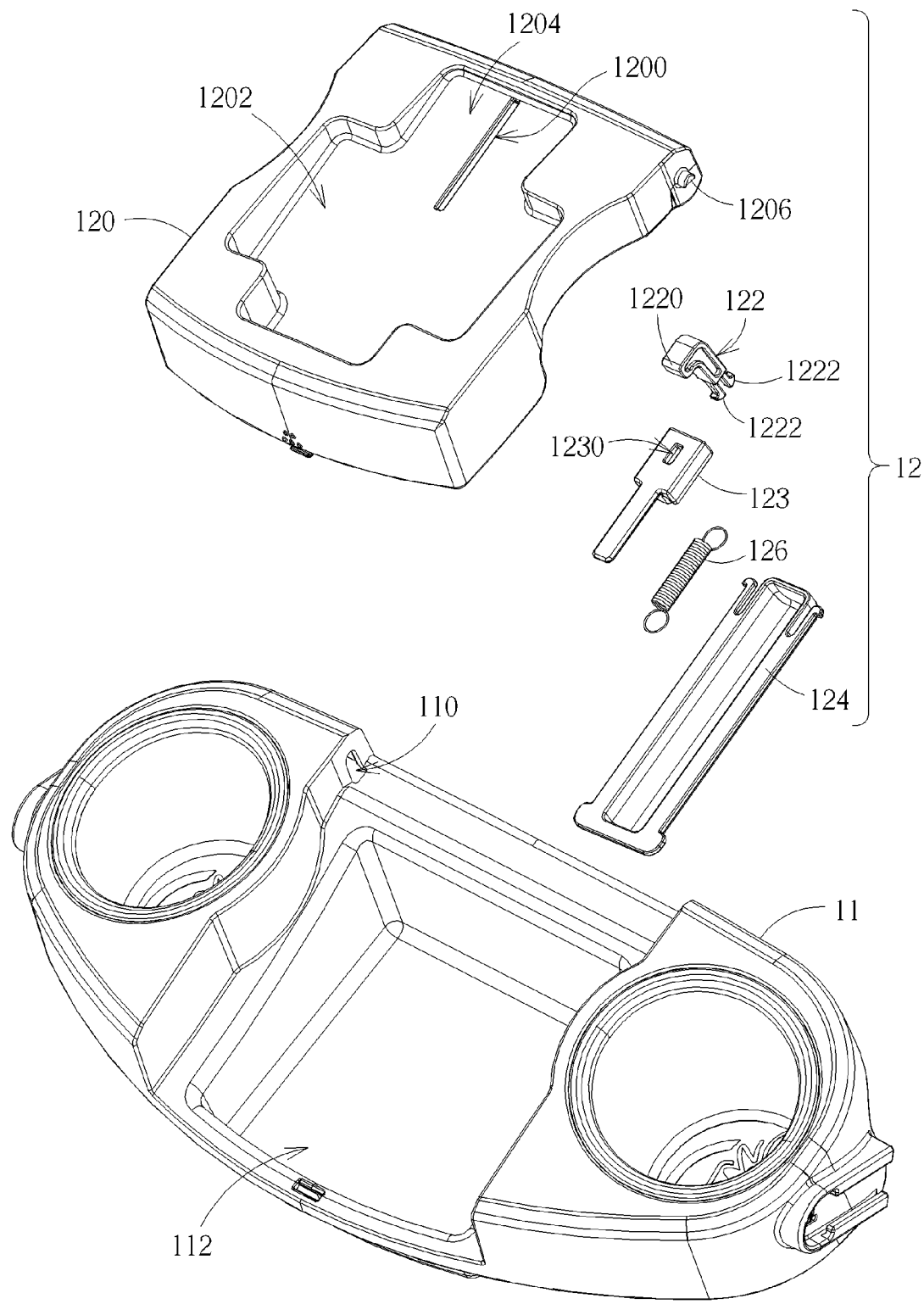
FIG. 3 is an exploded view illustrating the organizer and the accommodating mechanism shown in FIG. 2.
Figure 4:
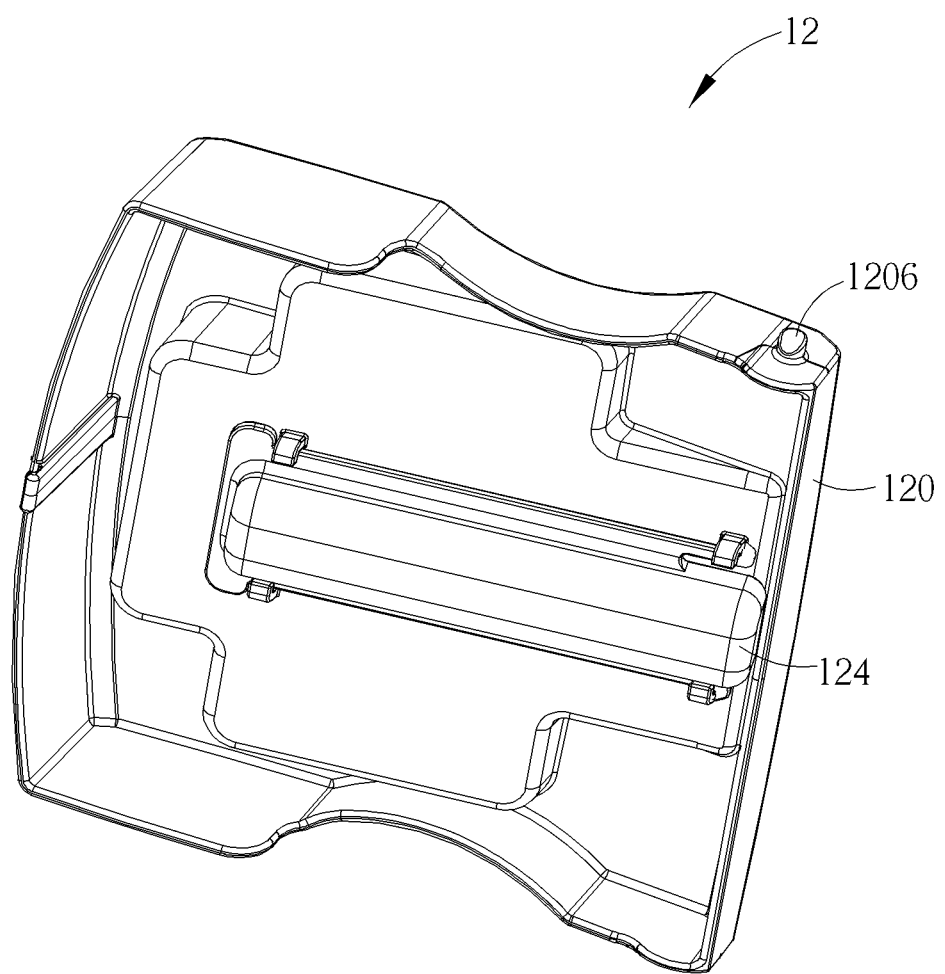
FIG. 4 is a bottom view illustrating the accommodating mechanism shown in FIG. 2.
Figure 5:
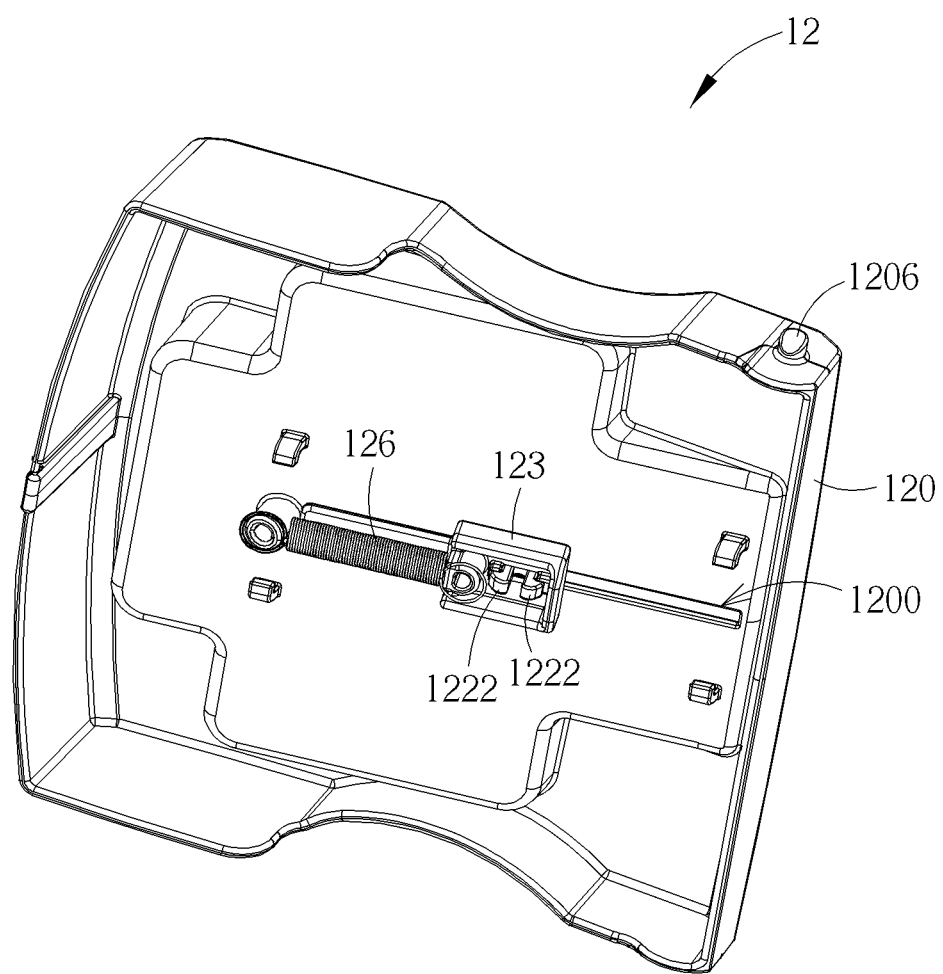
FIG. 5 is a bottom view illustrating the accommodating mechanism shown in FIG. 4 without the mounting member.
Figure 6:
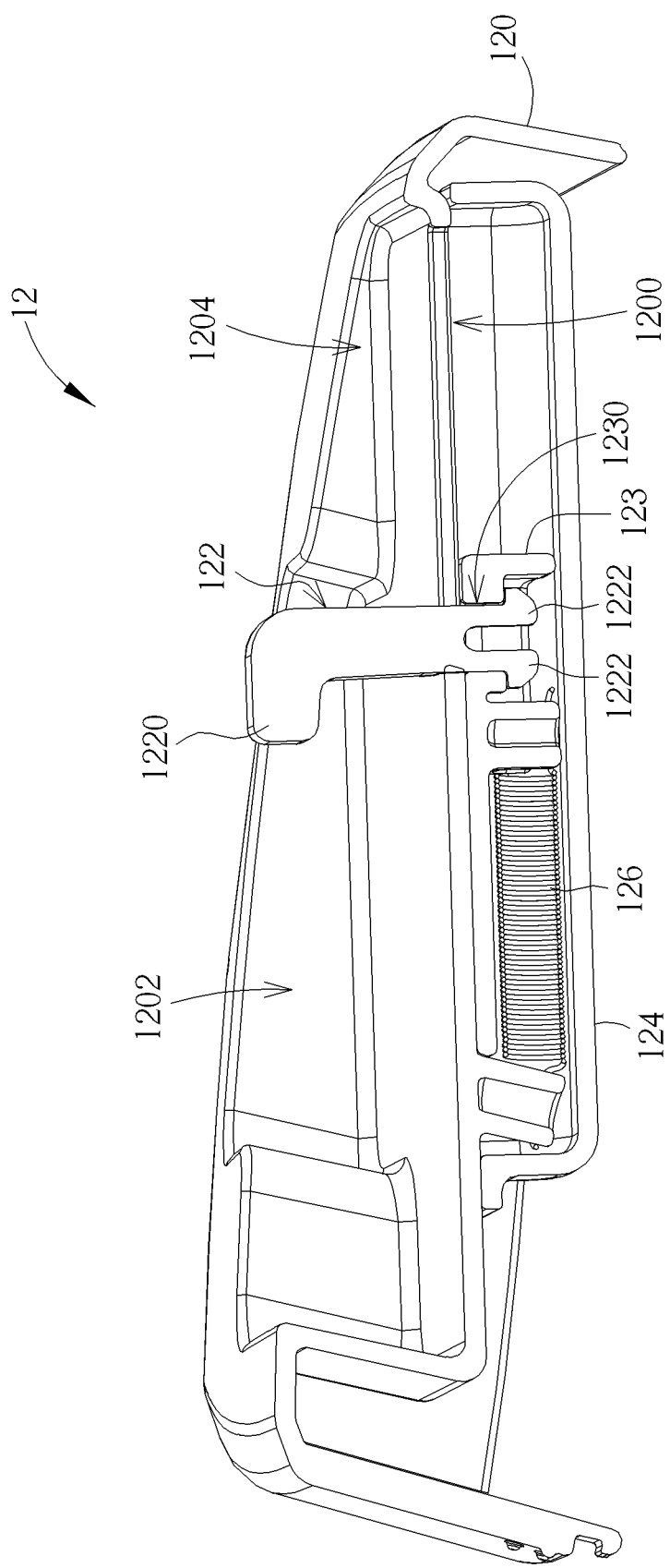
FIG. 6 is a cross-sectional view illustrating the accommodating mechanism shown in FIG. 2.
Figure 7:
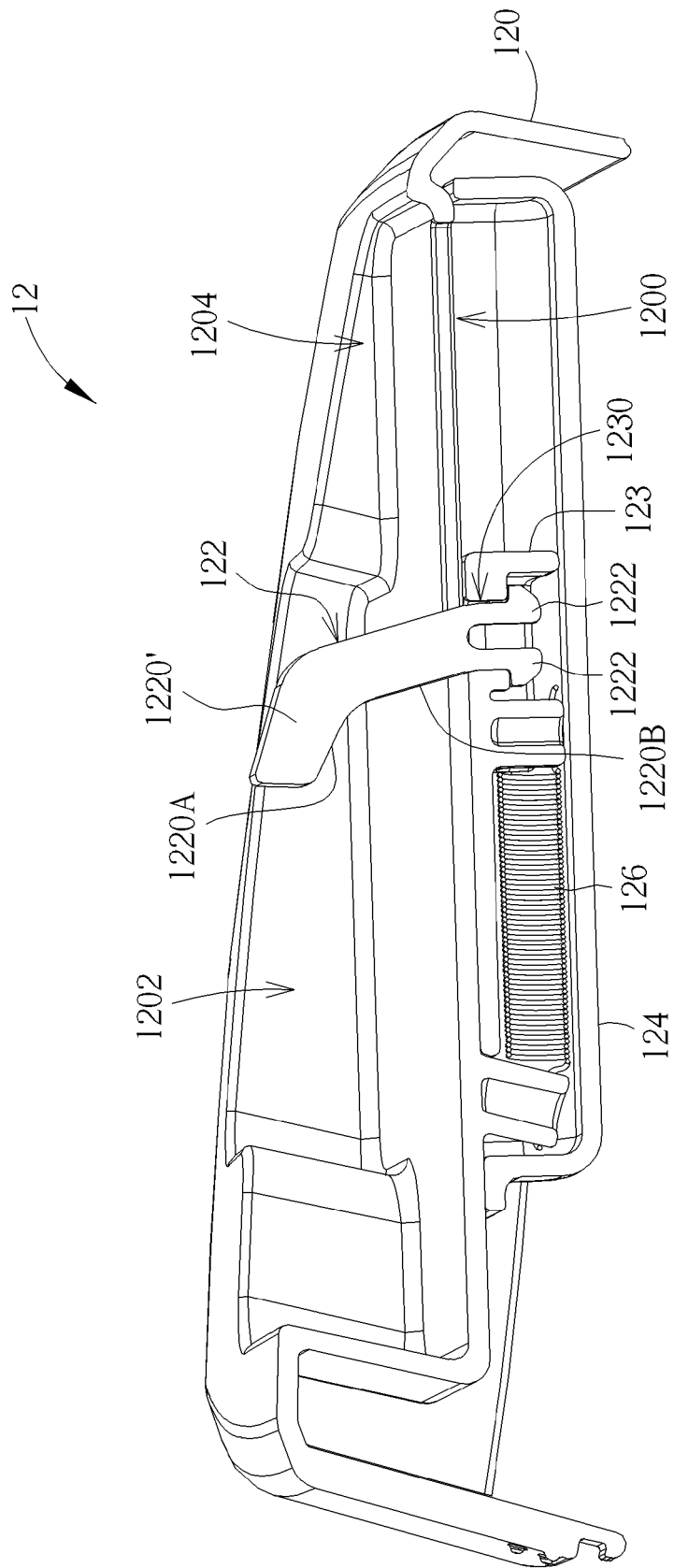
FIG. 7 is a cross-sectional view illustrating the accommodating mechanism shown in FIG. 2 with another hook portion.
Figure 8:
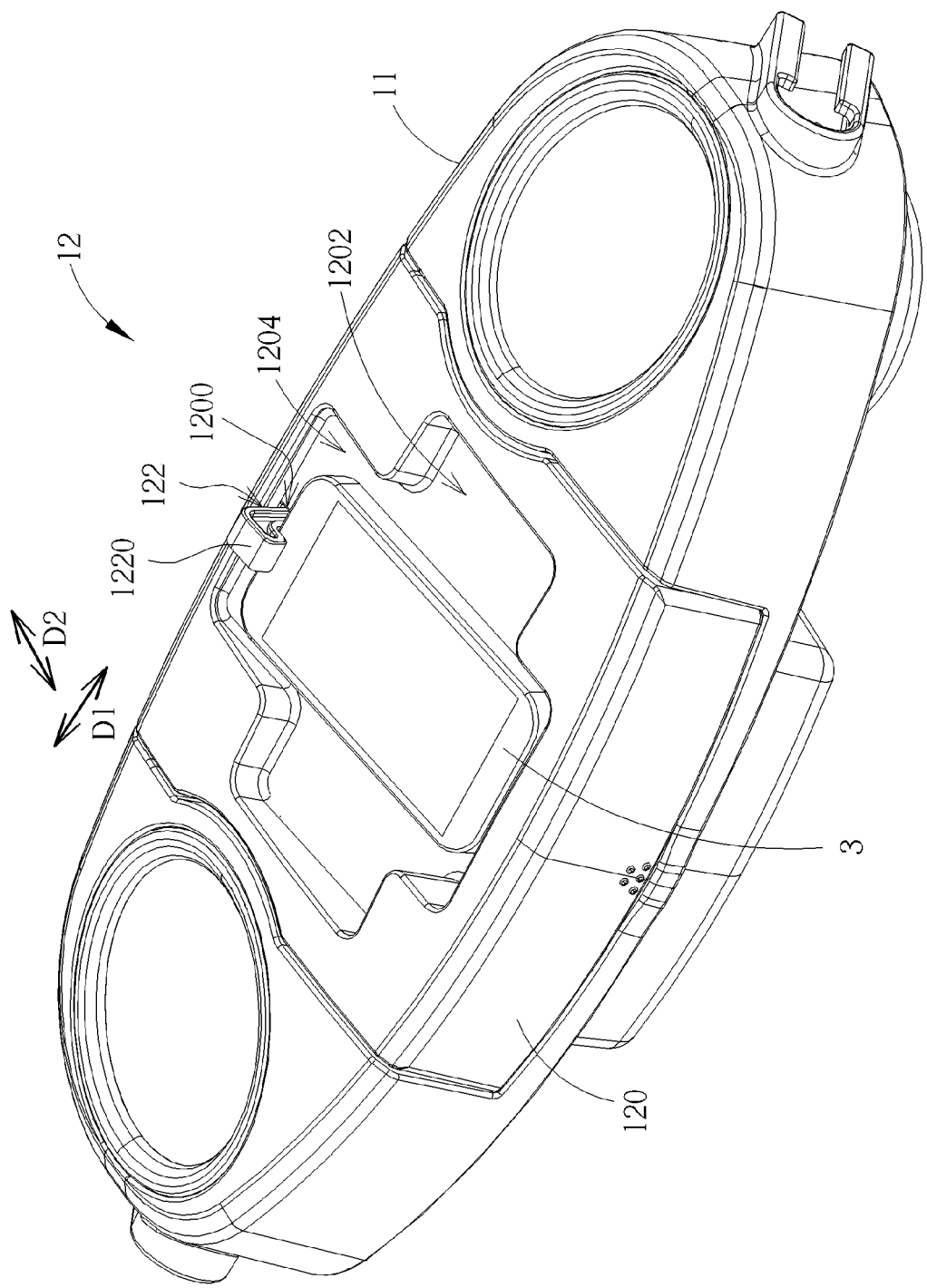
FIG. 8 is a perspective view illustrating the mobile device accommodated in the second recess of the base in a second orientation.

Referring to FIGS. 1 to 8, FIG. 1 is a perspective view illustrating a baby carriage 1 according to an embodiment of the invention, wherein a mobile device 3 is accommodated in the first recess 1202 of the base 120 in a first orientation D1, FIG. 2 is a perspective view illustrating the organizer 11 and the accommodating mechanism 12 shown in FIG. 1 configured in another view angle, FIG. 3 is an exploded view illustrating the organizer 11 and the accommodating mechanism 12 shown in FIG. 2, FIG. 4 is a bottom view illustrating the accommodating mechanism 12 shown in FIG. 2, FIG. 5 is a bottom view illustrating the accommodating mechanism 12 shown in FIG. 4 without the mounting member 124, FIG. 6 is a cross-sectional view illustrating the accommodating mechanism 12 shown in FIG. 2, FIG. 7 is a cross-sectional view illustrating the accommodating mechanism 12 shown in FIG. 2 with another hook portion 1220', and FIG. 8 is a perspective view illustrating the mobile device 3 accommodated in the second recess 1204 of the base 120 in a second orientation D2.

As shown in FIG. 1, the baby carriage 1 comprises a frame 10, an organizer 11 and an accommodating mechanism 12. In this embodiment, the organizer 11 is disposed on an upper handle 100 of the frame 10 and the accommodating mechanism 12 is disposed on the organizer 11 so as to form a parent tray. The accommodating mechanism 12 is used for accommodating a mobile device 3 in two different orientations (as shown in FIGS. 2 and 8). The mobile device 3 may be smart phone, personal digital assistant (PDA), navigation devices, audio or video players, and so on. The baby carriage 1 is exemplified by stroller, but also can include infant crib, playard, high chair, infant swing, child car seat, booster, infant carrier, etc.

As shown in FIGS. 2 to 6, the accommodating mechanism 12 comprises a base 120, a clamping member 122, a moving member 123, a mounting member 124 and a resilient member 126. The resilient member 126 may be, but not limited to, a spring. The clamping member 122 is movably disposed on the base 120 and used for clamping the mobile device 3 on the base 120. In this embodiment, the clamping member 122 has a hook portion 1220 for holding the mobile device 3 with an end of the base 120. The moving member 123 is movably disposed on a bottom of the base 120. In this embodiment, the base 120 has a sliding groove 1200, the moving member 123 has an engaging hole 1230 and the clamping member 122 has two engaging portions 1222, which are exemplified by snap fingers in the current embodiment. The engaging portions 1222 of the clamping member 122 pass through the sliding groove 1200 of the base 120 so as to be engaged with the engaging hole 1230 of the moving member 123 and the moving member 123 is movably sandwiched between the mounting member 124 and the base 120 such that the clamping member 122 is movably disposed in the sliding groove 1200. Accordingly, the clamping member 122 can move freely with the moving member 123 along the sliding groove 1200 within the constraints of the mounting member 124. In this embodiment, both ends of the resilient member 126 are connected to the moving member 123 and the base 120, respectively, so that the resilient member 126 can provide tension to hold the mobile device 3 in place. In other words, the resilient member 126 can bias the clamping member 122 through the moving member 123 toward the mobile device 3. However, the invention is not limited thereto. The moving member 123 can be removed, and both ends of the resilient member 126 can be connected to the clamping member 122 and the base 120, respectively. In other words, the resilient member 126 can be connected to the clamping member 122 directly for biasing the clamping member 122 toward the mobile device 3.

Furthermore, another embodiment of hook portion 1220' is shown in FIG. 7. The hook portion 1220' has a first inclined surface 1220A and a second inclined surface 1220B, which is adjacent to the first inclined surface 1220A, at bottom thereof. Such contour can fit mobile devices of different thickness. For thicker device, it is held against the front portion of the hook portion 1220' on the first inclined surface 1220A. As for thinner device, it is held against rear portion of the hook portion 1220' on the second inclined surface 1220B.

As shown in FIGS. 2 and 8, the base 120 has a first recess 1202 for accommodating the mobile device 3 in a first orientation D1 (e.g. landscape orientation) and a second recess 1204 for accommodating the mobile device 3 in a second orientation D2 (e.g. portrait orientation) different from the first orientation D1. In this embodiment, the second recess 1204 crosses the first recess 1202 such that the second orientation D2 is perpendicular to the first orientation D1. But the invention is not limited thereto. The first recess can cross the second recess in any included angle therebetween.

A user can draw the clamping member 122 to move along the sliding groove 1200 so as to take the mobile device 3 out of the first recess 1202 or the second recess 1204 or put the mobile device 3 into the first recess 1202 or the second recess 1204. Once the mobile device 3 is accommodated in the first recess 1202 or the second recess 1204, the resilient member 126 can provide tension to hold the mobile device 3 in place between the hook portion 1220 and lower end of the first recess 1202 in the first orientation D1, or between the hook portion 1220 and lower end of the second recess 1204 in the second orientation D2. Accordingly, the accommodating mechanism 12 of the invention can support all mobile devices as well as offer both portrait and landscape orientations.

In this embodiment, a bottom surface of the first recess 1202 and a bottom surface of the second recess 1204 are inclined, i.e., recessed inward gradually from top to bottom, so that the user can watch the mobile device 3, which is accommodated in the first recess 1202 or the second recess 1204, in a comfortable viewing angle.

Moreover, in this embodiment, the accommodating mechanism 12 can be pivotally connected to the organizer 11 by pivoting portions 1206 on opposite sides of the base 120 and pivoting holes 110 on opposite sides of the organizer 11. It should be noted that only one pivoting portion 1206 and only one pivoting hole 110 are shown in FIG. 3 due to the view angle. There is an accommodating space 112 formed between the accommodating mechanism 12 and the organizer 11. Therefore, a user can rotate the accommodating mechanism 12 with respect to the organizer 11 to open or close the accommodating mechanism 12 so as to take object(s) out of the accommodating space 112 or put object(s) into the accommodating space 112.

Figure 9:
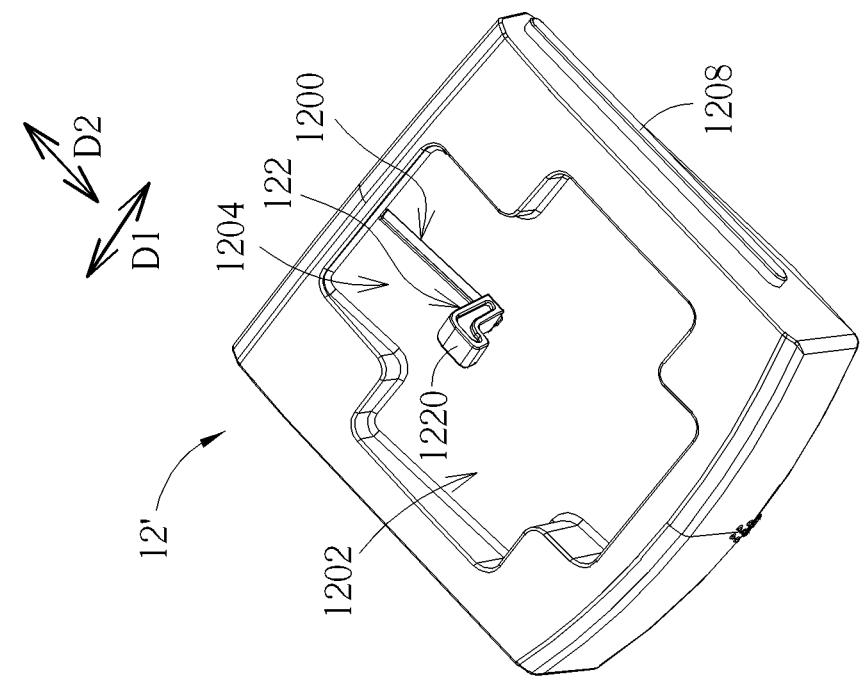
FIG. 9 is a perspective view illustrating an organizer and an accommodating mechanism according to another embodiment of the invention.
Figure 9:
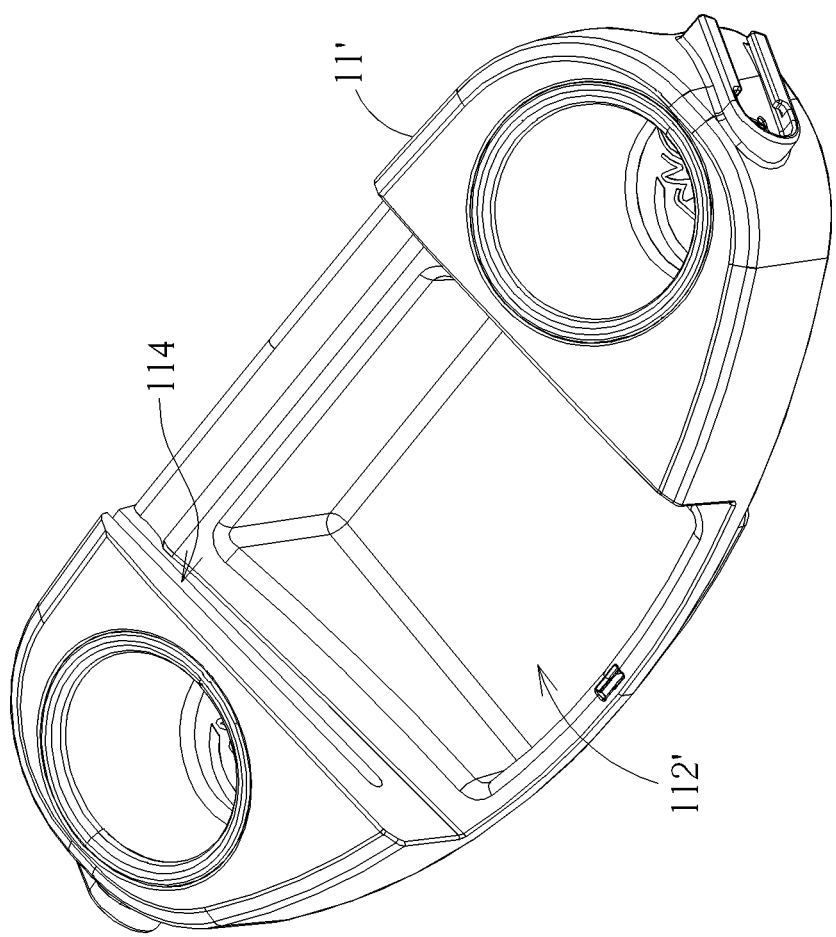

Referring to FIG. 9, FIG. 9 is a perspective view illustrating an organizer 11' and an accommodating mechanism 12' according to another embodiment of the invention. In this embodiment, the accommodating mechanism 12' can be slidably disposed on the organizer 11' by sliding portions 1208 on opposite sides of the base 120 and sliding grooves 114 on opposite sides of the organizer 11'. It should be noted that only one sliding portion 1208 and only one sliding groove 114 are shown in FIG. 9 due to the view angle. There is an accommodating space 112' formed between the accommodating mechanism 12' and the organizer 11'. Therefore, a user can slide the accommodating mechanism 12' with respect to the organizer 11' to open or close the accommodating mechanism 12' so as to take object(s) out of the accommodating space 112' or put object(s) into the accommodating space 112'.

It should be noted that, in another embodiment, the aforesaid accommodating mechanism 12 may be fixed on the organizer 11. For example, the accommodating mechanism 12 and the organizer 11 may be formed integrally so that the accommodating mechanism 12 cannot move with respect to the organizer 11.

Figure 10:
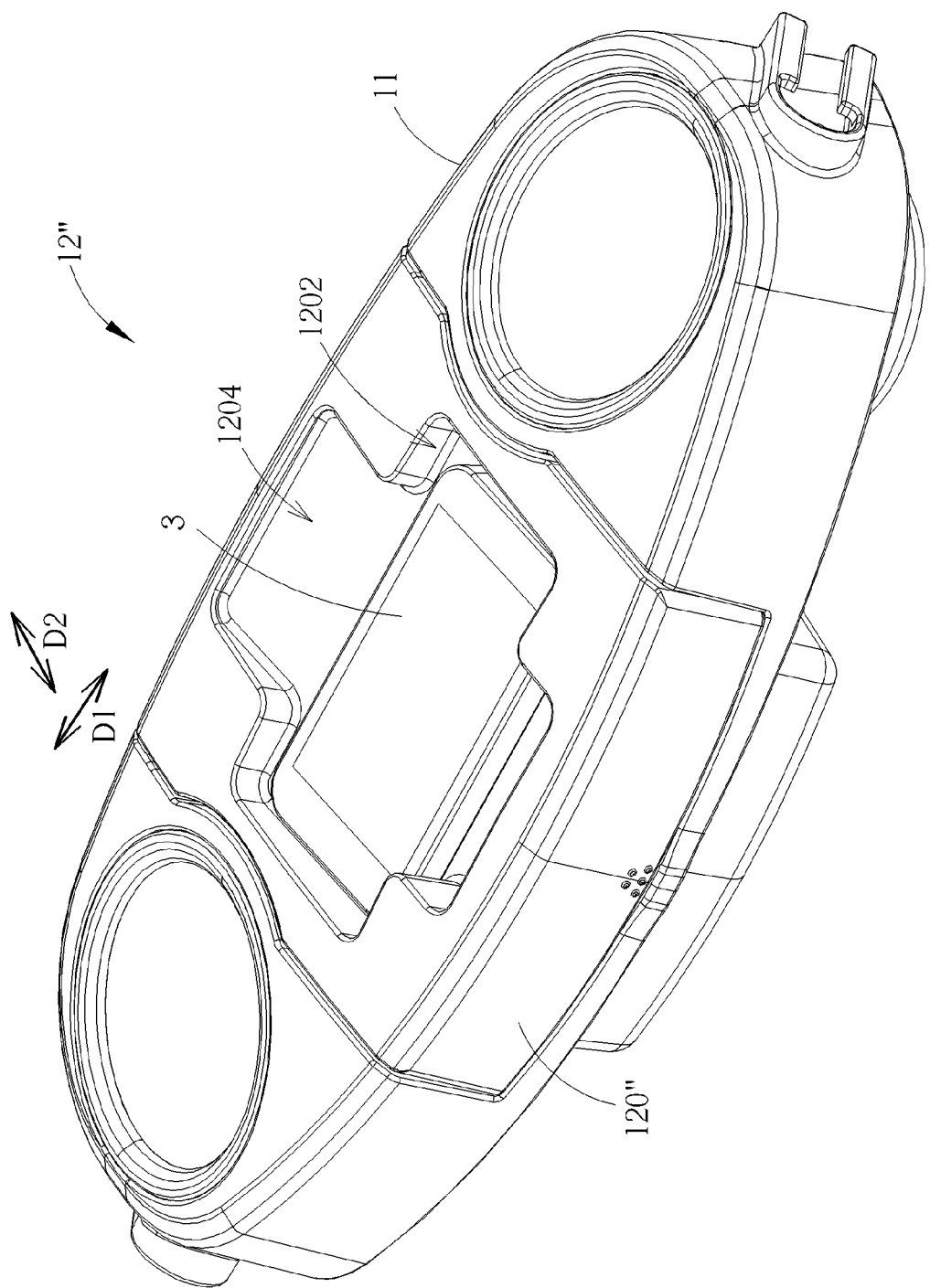
FIG. 10 is a perspective view illustrating an accommodating mechanism according to another embodiment of the invention.

Referring to FIG. 10, FIG. 10 is a perspective view illustrating an accommodating mechanism 12" according to another embodiment of the invention. The accommodating mechanism 12 shown in FIG. 1 can be replaced by the accommodating mechanism 12" shown in FIG. 10. The main difference between the accommodating mechanism 12" and the aforesaid accommodating mechanism 12 is that the accommodating mechanism 12' does not comprise the clamping member 122, the moving member 123, the mounting member 124 and the resilient member 126, and therefore no sliding groove is formed on the base 120'. As shown in FIG. 10, the base 120" of the accommodating mechanism 12" has the first recess 1202 for accommodating the aforesaid mobile device 3 in the first orientation D1 and the second recess 1204 for accommodating the aforesaid mobile device 3 in the second orientation D2 different from the first orientation D1. In this embodiment, the user can take the mobile device 3 out of the first recess 1202 or the second recess 1204 immediately or put the mobile device 3 into the first recess 1202 or the second recess 1204 immediately. Accordingly, the accommodating mechanism 12" of the invention can support all mobile devices as well as offer both portrait and landscape orientations.

Figure 11:
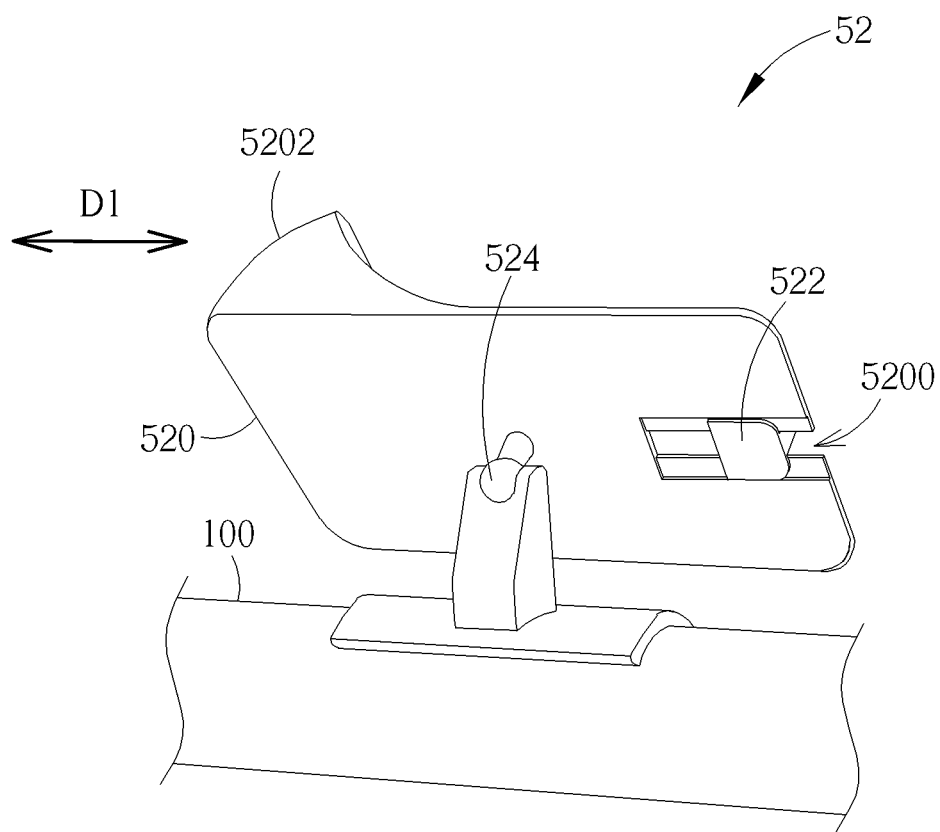
FIG. 11 is a perspective view illustrating an accommodating mechanism according to another embodiment of the invention.
Figure 12:
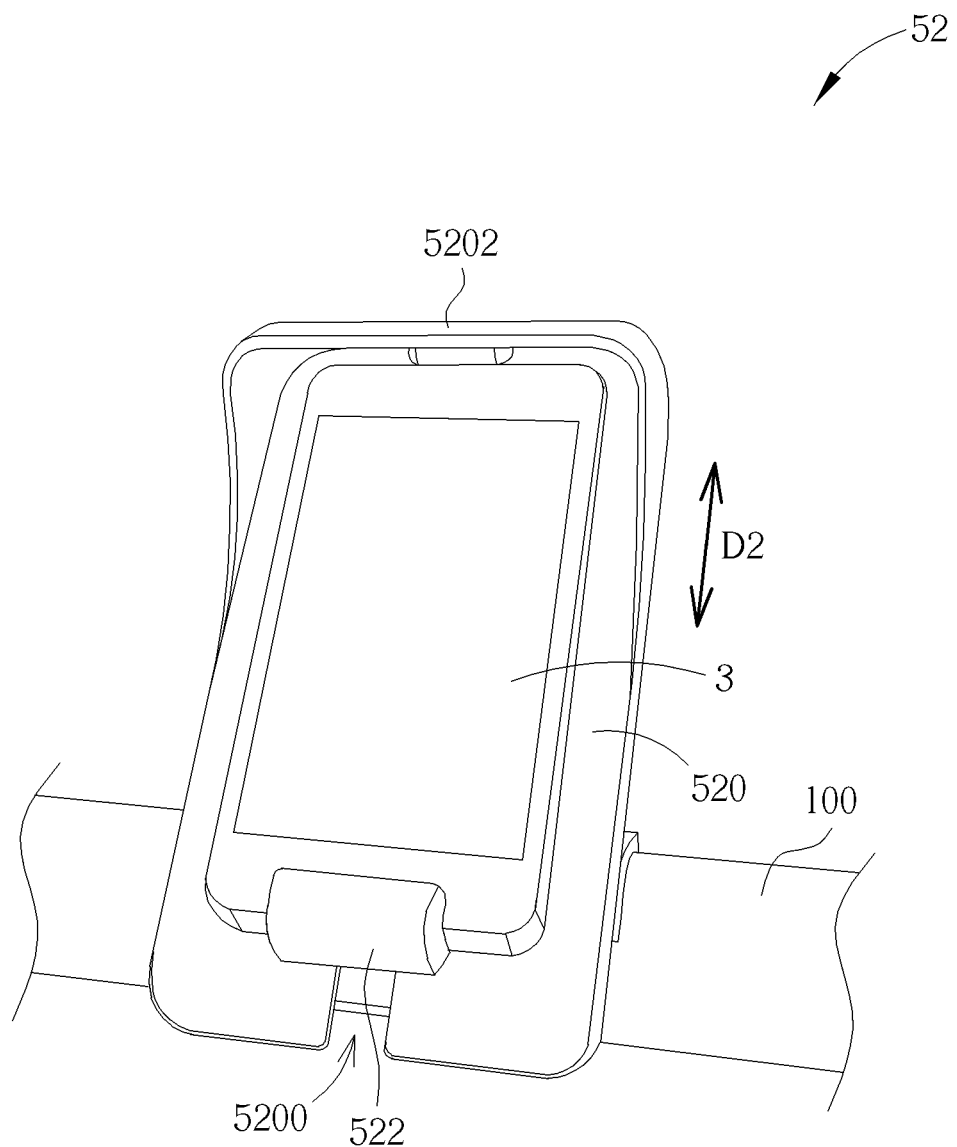
FIG. 12 is a perspective view illustrating the accommodating mechanism shown in FIG. 11 configured in another orientation.

Referring to FIGS. 11 and 12, FIG. 11 is a perspective view illustrating an accommodating mechanism 52 according to another embodiment of the invention, and FIG. 12 is a perspective view illustrating the accommodating mechanism 52 shown in FIG. 11 configured in another orientation. As shown in FIGS. 11 and 12, the accommodating mechanism 52 comprises a base 520, a clamping member 522 and a universal joint 524. In this embodiment, the accommodating mechanism 52 can be disposed on the upper handle 100 of the frame 10 shown in FIG. 1 and used for accommodating the mobile device 3 in two different orientations.

The clamping member 522 is movably disposed on the base 520 and used for clamping the mobile device 3 on the base 520. In this embodiment, the base 520 has a sliding groove 5200 and the clamping member 522 is movably disposed in the sliding groove 5200 in a tight fitting manner. It should be noted that the aforesaid resilient member 126 may be installed on the accommodating mechanism 52 in similar manner as the aforesaid embodiment. For example, both ends of the resilient member 126 can be connected to the clamping member 522 and the base 520 so as to provide tension to hold the mobile device 3 in place.

In this embodiment, the base 520 is disposed on the upper handle 100 of the frame 10 shown in FIG. 1 through the universal joint 524 such that the mobile device 3, which is clamped on the base 520 by the clamping member 522, is capable of being changed in any orientations including the first orientation D1 shown in FIG. 11 (e.g. landscape orientation) and the second orientation D2 shown in FIG. 12 (e.g. portrait orientation). Furthermore, the base 520 has a light shielding structure 5202 for shielding the mobile device 3 from ambient light such that the user can watch the mobile device 3 clearly under the sun, especially for that equipped with LCD or OLED display.

A user can draw the clamping member 522 to move along the sliding groove 5200 so as to take the mobile device 3 out of the base 520 or put the mobile device 3 on the base 520. Once the mobile device 3 is put on the base 520, the clamping member 522 can keep the mobile device 3 securely in place and then the user can rotate the base 520 through the universal joint 524 to any orientations including the first orientation D1 and the second orientation D2. Accordingly, the accommodating mechanism 52 of the invention can support all mobile devices as well as offer both portrait and landscape orientations.

As mentioned in the above, the invention uses the clamping member to clamp the mobile device on the base. Since the clamping member is movably disposed on the base, the clamping member can be operated to move according to sizes of different mobile devices so as to clamp all kinds of mobile devices on the base. Furthermore, the invention may form two recesses on the base for accommodating the mobile device in two different orientations (e.g. portrait and landscape orientations) or, alternatively, the invention may connect the base to the universal joint so as to adjust the mobile device in any orientations including portrait and landscape orientations. Accordingly, the accommodating mechanism of the invention can support all mobile devices as well as offer at least both portrait and landscape orientations such that it is very convenient for users to access or watch their device for purposes of using it while other tasks are being completed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A baby carriage comprising:
a frame; and
an organizer disposed on the frame;
an accommodating mechanism disposed on the organizer, pivotally connected to the organizer, and used for accommodating a mobile device, an accommodating space being formed between the accommodating mechanism and the organizer, the accommodating mechanism comprising:
a base; and a clamping member movably disposed on the base and used for clamping the mobile device on the base.

2. The baby carriage of claim 1, wherein the clamping member has a hook portion for holding the mobile device with an end of the base.

3. The baby carriage of claim 2, wherein the hook portion has a first inclined surface and a second inclined surface, which is adjacent to the first inclined surface, at bottom thereof.

4. The baby carriage of claim 1, wherein the base has a sliding groove and the clamping member is movably disposed in the sliding groove.

5. The baby carriage of claim 4, wherein the accommodating mechanism further comprises a resilient member used for biasing the clamping member toward the mobile device.

6. The baby carriage of claim 5, wherein the accommodating mechanism further comprises a moving member movably disposed on a bottom of the base, the moving member has an engaging hole, the clamping member has an engaging portion, and the engaging portion passes through the sliding groove so as to be engaged with the engaging hole.

7. The baby carriage of claim 6, wherein the accommodating mechanism further comprises a mounting member and the moving member is movably sandwiched between the mounting member and the base.

8. The baby carriage of claim 6, wherein both ends of the resilient member are connected to the moving member and the base, respectively.

9. The baby carriage of claim 1, wherein the base has a first recess for accommodating the mobile device in a first orientation.

10. The baby carriage of claim 9, wherein a bottom surface of the first recess is inclined.

11. The baby carriage of claim 9, wherein the base has a second recess for accommodating the mobile device in a second orientation different from the first orientation.

12. The baby carriage of claim 11, wherein the second recess crosses the first recess such that the second orientation is perpendicular to the first orientation.

13. The baby carriage of claim 11, wherein a bottom surface of the second recess is inclined.

14. A baby carriage comprising:
a frame; and
an organizer disposed on the frame;
an accommodating mechanism disposed on the organizer, pivotally connected to the organizer with an accommodating space being formed between the accommodating mechanism and the organizer, and the accommodating mechanism comprising a base, the base having a first recess for accommodating a mobile device in a first orientation and a second recess for accommodating the mobile device in a second orientation different from the first orientation.

15. The baby carriage of claim 14, wherein the accommodating mechanism further comprises a clamping member movably disposed on the base and used for clamping the mobile device on the base.

16. The baby carriage of claim 15, wherein the clamping member has a hook portion for holding the mobile device with an end of the base.

17. The baby carriage of claim 16, wherein the hook portion has a first inclined surface and a second inclined surface, which is adjacent to the first inclined surface, at bottom thereof.

18. The baby carriage of claim 15, wherein the base has a sliding groove and the clamping member is movably disposed in the sliding groove.

19. The baby carriage of claim 18, wherein the accommodating mechanism further comprises a resilient member used for biasing the clamping member toward the mobile device.

20. The baby carriage of claim 19, wherein the accommodating mechanism further comprises a moving member movably disposed on a bottom of the base, the moving member has an engaging hole, the clamping member has an engaging portion, and the engaging portion passes through the sliding groove so as to be engaged with the engaging hole.

21. The baby carriage of claim 20, wherein the accommodating mechanism further comprises a mounting member and the moving member is movably sandwiched between the mounting member and the base.

22. The baby carriage of claim 20, wherein both ends of the resilient member are connected to the moving member and the base, respectively.

23. The baby carriage of claim 14, wherein bottom surfaces of the first recess and the second recess are inclined.

24. The baby carriage of claim 14, wherein the second recess crosses the first recess such that the second orientation is perpendicular to the first orientation.

* * * * *